(12) United States Patent
Ito

(10) Patent No.: US 7,715,124 B2
(45) Date of Patent: May 11, 2010

(54) OPTICAL ELEMENT DRIVING DEVICE AND IMAGING APPARATUS

(75) Inventor: Daisuke Ito, Osaka (JP)

(73) Assignee: Panasonic Corporation, Osaka (JP)

( * ) Notice: Subject to any disclaimer, the term of this patent is extended or adjusted under 35 U.S.C. 154(b) by 1 day.

(21) Appl. No.: 12/269,355

(22) Filed: Nov. 12, 2008

(65) Prior Publication Data

US 2009/0128928 A1    May 21, 2009

(30) Foreign Application Priority Data

Nov. 16, 2007    (JP) .............................. 2007-298546

(51) Int. Cl.
*G02B 7/02* (2006.01)
(52) U.S. Cl. .................... 359/814; 359/813; 359/824
(58) Field of Classification Search ................. 359/814, 359/813, 824
See application file for complete search history.

(56) References Cited

U.S. PATENT DOCUMENTS 7,440,688 B2 * 10/2008 Uehara et al. ................. 396/55

2006/0082659 A1    4/2006 Koo

FOREIGN PATENT DOCUMENTS

| JP | 8-94904 A | 4/1996 |
|---|---|---|
| JP | 10-225083 A | 8/1998 |
| JP | 11-15037 A | 1/1999 |
| JP | 2000-75335 A | 3/2000 |
| JP | 2000-194027 A | 7/2000 |
| JP | 2006-119579 A | 5/2006 |
| JP | 2006-243704 A | 9/2006 |
| JP | 2007-17957 A | 1/2007 |

* cited by examiner

*Primary Examiner*—Joseph Martinez
(74) *Attorney, Agent, or Firm*—Panasonic Patent Center; Dhiren Odedra; Kerry Culpepper

(57) ABSTRACT

A lens driving device includes a lens, a moving member that supports the lens, a stationary member that movably supports the moving member, a pitch drive mechanism that drives the moving member in the pitch correction direction, and a yaw drive mechanism that drives in the yaw correction direction. The pitch drive mechanism has first and second magnets provided to the stationary member, and first and second coils provided to the moving member. The yaw drive mechanism has a third magnet provided to the stationary member, and a third coil provided to the moving member. The first and second coils are arranged on opposite sides of the lens when viewed in a third direction that is perpendicular to the pitch and yaw correction directions, and the third coil is arranged on the same side as the first coil with respect to the lens when viewed in the third direction.

20 Claims, 10 Drawing Sheets

OPTICAL ELEMENT DRIVING DEVICE AND IMAGING APPARATUS

CROSS-REFERENCE TO RELATED APPLICATIONS

This application claims priority to Japanese Patent Application No. JP 2007-298546 filed on Nov. 16, 2007. The entire disclosure of Japanese Patent Application No. JP 2007-298546 is hereby incorporated herein by reference.

BACKGROUND

1. Technical Field

The technical field relates to an optical element driving device for driving an optical element of an imaging apparatus, and to an imaging apparatus in which this device is used.

2. Description of the Related Art

Recent years have witnessed the practical application of products such as digital imaging apparatus, typified by digital still cameras and digital video cameras, which are equipped with image blur correction mechanisms that correct image blur caused by hand shake in the pitch and yaw directions of the apparatus during image capture. With most image blur correction mechanisms, image blur is corrected by using a lens driving device (an example of an optical element driving device) to drive part of the imaging optical system in two directions, namely, a pitch correction direction and a yaw correction direction that are perpendicular to the optical axis.

Furthermore, lens driving devices for correcting image blur are increasingly being installed in imaging apparatus that make use of a bending optical system including prisms, mirrors, and so forth.

An advantage of an imaging apparatus equipped with a bending optical system is that the camera main body can be thinner. Accordingly, the lens driving device for correcting image blur also needs to be thinner in the thickness direction of the camera main body, which is accomplished, for example, by disposing the linear actuator or other drive unit on one or both sides with respect to the lens. For instance, imaging apparatus are known in the past in which the drive unit is provided on one or both sides of the lens and the camera main body is made thinner in its thickness direction, as disclosed in Japanese Laid-Open Patent Applications 2006-243704, 2007-17957, and 2000-194027.

With the lens driving device disclosed in Japanese Laid-Open Patent Application 2006-243704, two drive units for driving in the pitch and yaw correction directions are provided on one side in the yaw correction direction of a circular lens (an optical element), and disposed to be spaced apart vertically. The elliptical coil and magnets that constitute the drive units are disposed above and below on one side of the lens. The coils are disposed such that they are wound around an axis perpendicular to the optical axis.

With the lens driving device disclosed in Japanese Laid-Open Patent Application 2007-17957, the correcting lens is roughly elliptical in shape, obtained by cutting off two circular sides in parallel. The major axis direction of this lens is termed the yaw correction direction, and two drive units for driving in the pitch and yaw correction directions are disposed on one side in the yaw correction direction, and aligned vertically. The coils are disposed such that they are wound around an axis parallel to the optical axis.

With the lens driving device disclosed in Japanese Laid-Open Patent Application 2000-194027, a pair of drive units for driving in the pitch correction direction and a pair of drive units for driving in the yaw correction direction are disposed on both sides in the lengthwise and lateral directions of a circular lens to surround the lens on four sides.

With these three patent documents, a guide unit having a guide shaft is used to guide in the pitch correction direction and the yaw correction direction, and the lens is guided linearly by a bi-directional guide shaft.

With the lens driving devices discussed in Japanese Laid-Open Patent Applications 2006-243704 and 2007-17957, first and second direction drive mechanisms are disposed on one side of the lens, so no drive mechanism needs to be disposed in the thickness direction, which allows the camera main body to be thinner. However, since drive force is imparted to one side of the lens that is driven, the drive center of the drive mechanisms ends up being separated from the movable center of gravity of the portion that moves. Therefore, rotational moment is generated in the moving portion, the drive direction is at an angle to the movement direction with the guide shaft that linearly guides the lens, and a jerky motion tends to result from an increase in sliding resistance. Consequently, the lens driving devices discussed in Patent Documents 1 and 2 tend not to drive the lens accurately.

With the lens driving device discussed in Japanese Laid-Open Patent Application 2000-194027, the lens can be driven relatively accurately because both sides of the lens are driven uniformly. However, since pairs of drive units of the lens driving device are disposed to surround the lens on four sides, the size of the lens driving device increases in the thickness direction of the camera main body, so it is more difficult to reduce the thickness of the camera main body.

SUMMARY

It is an object to reduce the size of an optical element driving device in the thickness direction of the camera main body, and to be able to drive the optical element accurately.

An optical element driving device according to a first aspect includes at least one optical element, a moving member, a stationary member, a first direction drive mechanism, and a second direction drive mechanism. The moving member is capable of supporting the optical element. The stationary member supports the moving member to allow movement in a first direction and a second direction that intersects the first direction. The first direction drive mechanism has first and second drive parts provided to the stationary member, and first and second driven parts provided to the moving member and capable of moving upon receipt of drive force from the first and second drive parts, and drives the moving member in the first direction. The second direction drive mechanism has a third drive part provided to the stationary member, and a third driven part provided to the moving member and capable of moving upon receipt of drive force form the third drive part, and drives the moving member in the second direction. The first and second driven parts are arranged on opposite sides of the optical element when viewed in a third direction that is perpendicular to the first and second directions, and the third driven part is arranged on the same side as the first driven part with respect to the optical element when viewed in the third direction.

When this optical element driving device is used to correct image blur, for example, the first direction drive mechanism and the second direction drive mechanism are controlled according to the detection result of a shake detection sensor, and the moving member supporting the optical element moves in the first direction and the second direction. With this moving member, the first and second driven parts are arranged on opposite sides of the optical element, and the third driven part is arranged on the same side as the first driven part with respect to the optical element.

The "optical element" referred to here encompasses all optical elements used in imaging optical systems such as, for example, lenses, imaging elements that convert optical images into electrical signals, and prisms, mirrors, and other such bending elements that bend the axis of light.

Since the first driven part and the second driven part here are arranged on opposite sides of the optical element, the optical element can be driven on both sides thereof. Accordingly, even if the drive centers of the first and second driven parts should diverge from the center of gravity of the moving portion, the first driven part and the second driven part can be disposed so that the two moments acting on the first and second driven parts around the center of gravity will cancel each other out. This allows the optical element to be driven accurately.

Also, since the third driven part is disposed on the first driven part side, the third driven part can be disposed close to the first driven part, and this reduces the size in the first direction. Accordingly, if the first direction is the thickness direction of the camera main body, the camera main body can be made thinner.

An optical element driving device according to a second aspect is the optical element driving device of the first aspect, wherein, in the moment around the center of gravity of a portion that includes the moving member, a first moment that acts on the first driven part under the drive force of the first drive part and a second moment that acts on the second driven part under the drive force of the second drive part both act in a direction of canceling each other out.

An optical element driving device according to a third aspect is the optical element driving device of the second aspect, wherein the first moment and the second moment substantially cancel each other out.

An optical element driving device according to a fourth aspect is the optical element driving device of the second or third aspect, wherein the drive force of the first drive part is smaller than the drive force of the second drive part.

An optical element driving device according to a fifth aspect is the optical element driving device of any of the second to fourth aspects, wherein the third driven part is disposed closer than the first driven part to a first imaginary line parallel to the second direction and passing through the center of gravity.

An optical element driving device according to a sixth aspect is the optical element driving device of the fifth aspect, wherein the first and second driven parts are arranged on opposite sides of the first imaginary line when viewed in the third direction.

An optical element driving device according to a seventh aspect is the optical element driving device of the sixth aspect, wherein the third driven part is disposed aligned with the first driven part in the first direction.

An optical element driving device according to an eighth aspect is the optical element driving device of any of the fifth to seventh aspects, further including a first guide part that is disposed between the center of gravity and the first driven part in the second direction, and that guides the moving member in the first direction with respect to the stationary member.

An optical element driving device according to a ninth aspect is the optical element driving device of the eighth aspect, further including a first position sensor that is arranged on the same side of the optical element as the first driven part, and that detects the position of the moving member in the first direction with respect to the stationary member.

An optical element driving device according to a tenth aspect is the optical element driving device of any of the fifth to ninth aspects, wherein the center of gravity overlaps the optical element when viewed in the third direction.

An optical element driving device according to an eleventh aspect is the optical element driving device of any of the fifth to tenth aspects, wherein the first and second direction drive mechanisms are electromagnetic linear actuators, the plurality of first to third driven parts have first to third coils provided to the moving member, and the first to third drive parts have first to third magnets provided to the stationary member to be capable of being opposite the first to third coils.

An optical element driving device according to a twelfth aspect is the optical element driving device of the eleventh aspect, wherein the first magnet and the third magnet are formed integrally, the first magnet is magnetized to a different magnetic pole at a first boundary parallel to the second direction, and the third magnet is magnetized to a different magnetic pole at a third boundary parallel to the first direction.

An optical element driving device according to a thirteenth aspect is the optical element driving device of the twelfth aspect, wherein the second drive part further has a fourth magnet that is magnetized to a different magnetic pole at a fourth boundary parallel to the first direction and that is provided on the other side with respect to the optical element, and the second magnet and the fourth magnet are formed integrally and magnetized to a different magnetic pole at a second boundary parallel to the second direction the first magnet and the second magnet are provided arranged on opposite sides of the first imaginary line.

An optical element driving device according to a fourteenth aspect is the optical element driving device of the thirteenth aspect, wherein the second direction drive mechanism further has a fourth coil disposed opposite the fourth magnet.

An optical element driving device according to a fifteenth aspect is the optical element driving device of any of the eighth to fourteenth aspects, further including a second guide part that guides the moving member in the second direction with respect to the stationary member, wherein the moving member has a first moving frame that is mounted on the stationary member and is guided in the first direction by the first guide part, and a second moving frame that has a support part for supporting the optical element, is mounted on the first moving frame, and is guided in the second direction by the second guide part, and the second guide part is disposed on the first moving frame at a position that does not overlap the third drive part in the first direction.

An imaging apparatus according to a sixteenth aspect is an imaging apparatus capable of photographing a subject, including an imaging element, an imaging optical system, an optical element driving device, and a camera main body. The imaging element converts an optical image of the subject into an image signal. The imaging optical system includes a lens disposed opposite the imaging element, and emits an optical image of the subject to the imaging element. The optical element driving device is the one according to any of the first to fifteenth aspects, which drives the lens or the imaging element. The camera main body houses the imaging element, the imaging optical system, and the optical element driving device.

With this imaging apparatus, an optical image of the subject goes through the lens of the imaging optical system and is incident on the imaging element, where it is converted into an electrical signal. If the camera main body should happen to shake when the image is incident from the lens onto the imaging element, this is detected, and as a result the optical element driving device is driven in a first direction and a second direction and the image blur is corrected.

BRIEF DESCRIPTION OF DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

1: Overview of Digital Camera

Figure 1:
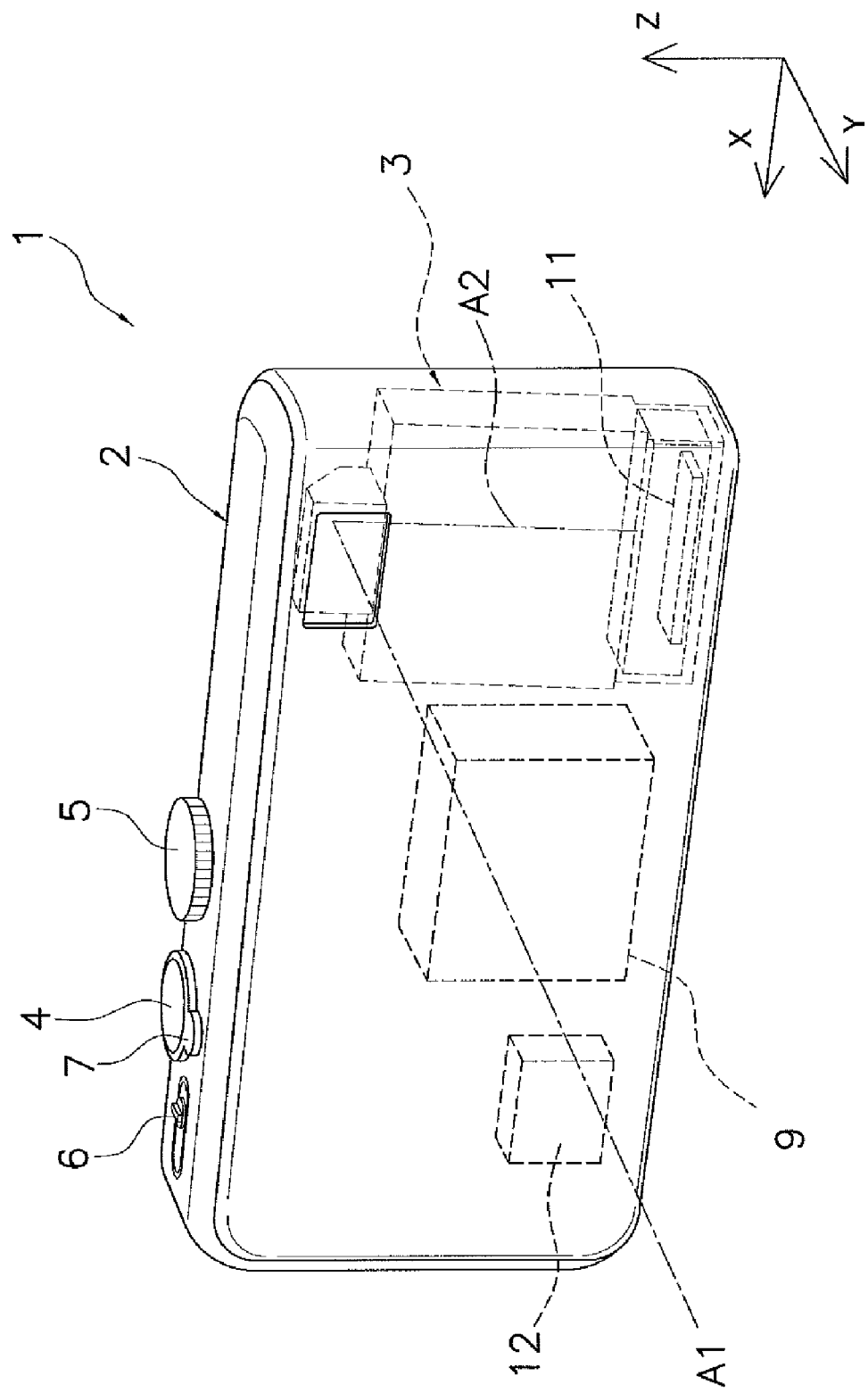
FIG. 1 is a simplified oblique view of a digital camera to which an embodiment has been applied, as seen from the front.
Figure 2:
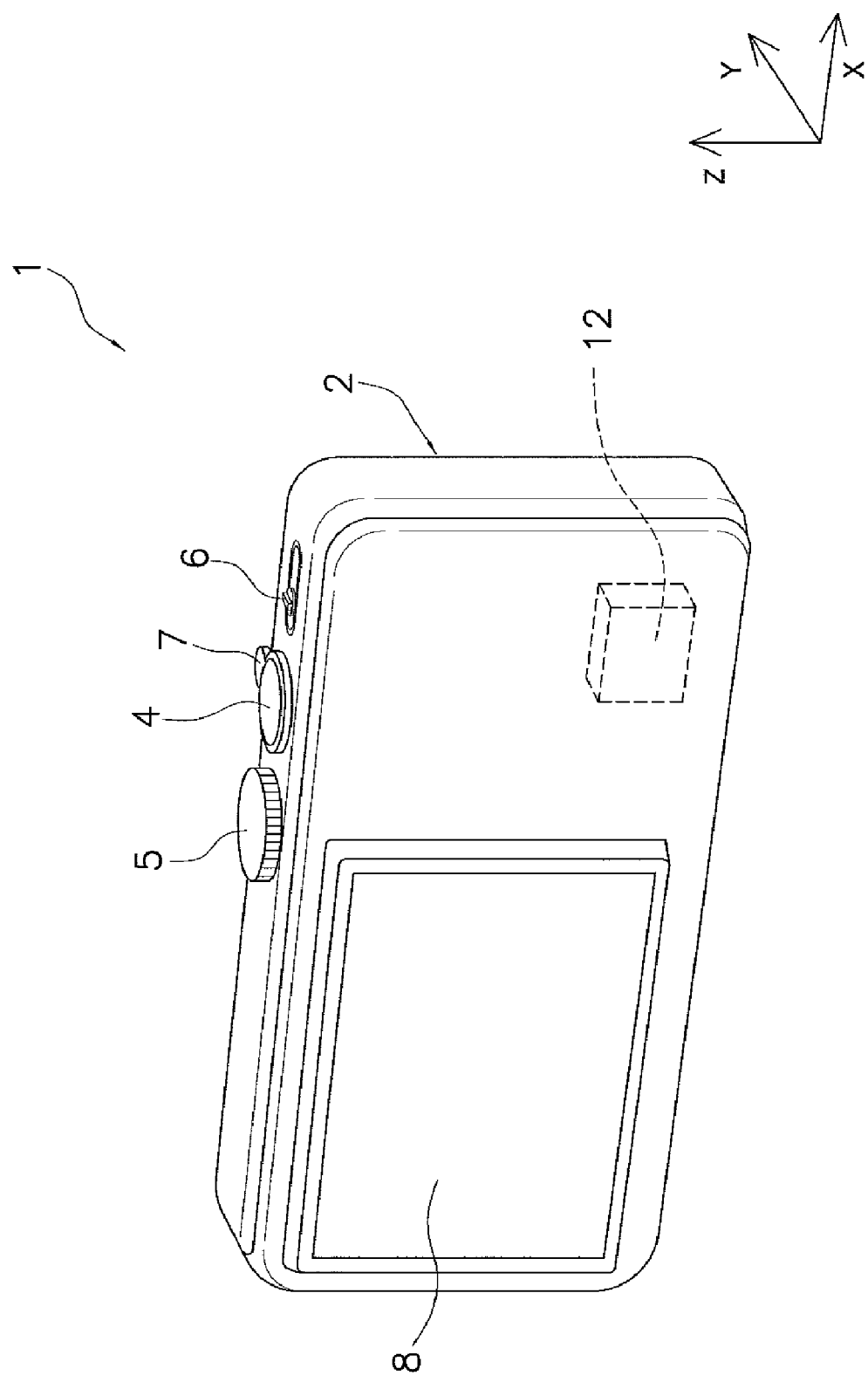
FIG. 2 is a simplified oblique view of a digital camera from the rear.

A digital camera 1 as an example of the imaging apparatus according to an embodiment of the present invention will now be described through reference to FIGS. 1 and 2. FIGS. 1 and 2 are simplified oblique views of the digital camera 1.

The digital camera 1 is a camera for capturing an image of a subject, and has a substantially rectangular camera main body 2. A lens barrel 3 having an imaging optical system for bending is installed inside the camera main body 2 for increasing magnification and reducing the size of the camera.

In the following description, the six sides of the digital camera 1 are defined as follows.

The side facing the subject when an image is being captured by the digital camera 1 is called the front face of the camera main body 2, and the face on the opposite side is called the rear face. When an image is captured such that the top and bottom in the vertical direction of the subject match up with the top and bottom in the short-side direction of the rectangular image being captured by the digital camera 1 (the aspect ratio (the ratio of long to short sides) is generally 3:2, 4:3, 16:9, etc.), the side facing upward in the vertical direction is called the top face, and the opposite side is called the bottom face. Further, when the an image is captured such that the top and bottom in the vertical direction of the subject match up with the top and bottom in the short-side direction of the rectangular image being captured by the digital camera 1, the side that is on the left when viewed from the subject side is called the left face, and the opposite side is called the right face. The above definitions are not intended to limit the usage orientation of the digital camera 1.

Based on the above definitions, FIG. 1 is an oblique view illustrating the front face, top face, and right face.

The same definitions apply not only to the six sides of the digital camera 1, but also to the six sides of the various constituent members disposed on the digital camera 1. That is, the above definitions apply to the six sides of the various constituent members in a state in which they have been disposed on the digital camera 1.

As shown in FIG. 1, a three-dimensional perpendicular coordinate system (right-hand system) is defined, having a Y axis perpendicular to the front face of the camera main body 2. Based on this definition, the direction facing the front face side from the rear face side is called the Y axis positive direction, the direction facing the left face side from the right face side is called the X axis positive direction, and the direction facing the top face side from the bottom face side and perpendicular to the X and Y axes is called the Z axis positive direction.

The drawings will be described below using this XYZ coordinate system as a reference. That is, the X axis positive side, the Y axis positive direction, and the Z axis positive direction in the drawings each refer to the same respective direction.

2: Overall Configuration of Digital Camera

Figure 3:
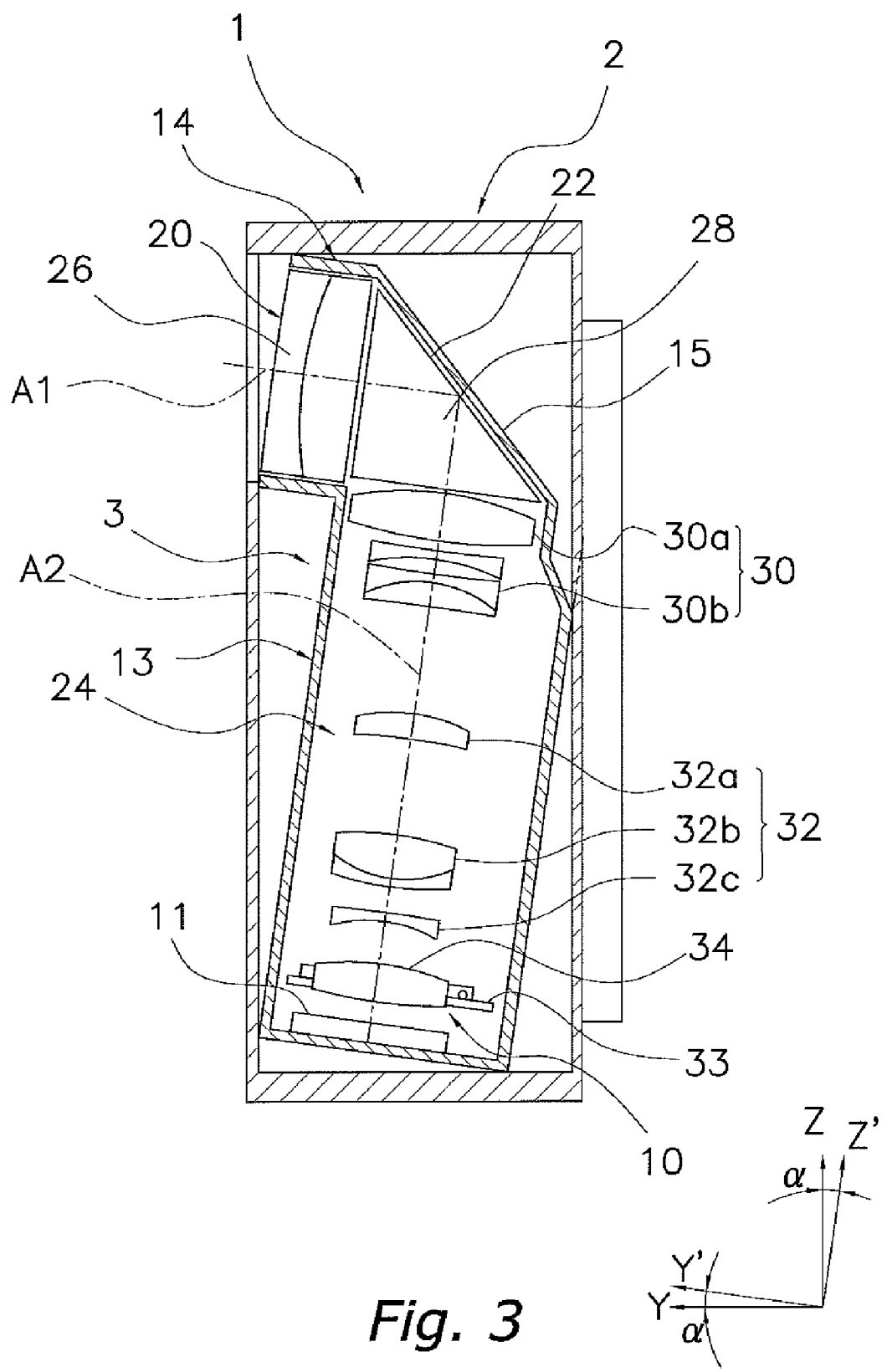
FIG. 3 is a cross sectional schematic of a lens barrel of a digital camera.

As shown in FIGS. 1 and 2, the digital camera 1 mainly includes a camera main body 2 that houses various units, an imaging optical system that forms an optical image of a subject, and a lens barrel 3 that movably supports the imaging optical system. As shown in FIG. 3, provided inside the lens barrel 3 are an image blur correction device 10 for correcting image blur, and an imaging element 11 that converts optical images into electrical signals, such as a CCD (charge coupled device), a CMOS (complementary metal-oxide semiconductor) sensor, or the like.

The imaging optical system is made up of a plurality of lens groups and an optical bending element, and the plurality of lens groups are disposed in a state of being aligned in a direction that is inclined by an angle α (The angle α is from 0.1 to 6 degrees, for example) from the Y and Z axis directions. In FIG. 3, the inclination angle is exaggerated over the actual angle in order to make the description easier to understand. In the following description, the axes inclined by the angle α from the Y and Z axes will be called the Y' axis and the Z' axis.

A release button 4, a control dial 5, a power switch 6, and a zoom adjusting lever 7 are provided to the top face of the camera main body 2 so that the user can control the imaging operation, etc. The release button 4 is used by the user to input the exposure timing. The control dial 5 is used by the user to make various settings related to imaging operation. The power switch 6 is used by the user to turn the digital camera 1 on or off The zoom adjusting lever 7 is used by the user to adjust the zoom magnification, and is able to rotate around the release button 4 within a specific angular range.

A liquid crystal monitor 8 that displays an image acquired by the imaging element 11 is provided to the rear face of the camera main body 2. The liquid crystal monitor 8 is disposed protruding from the rear face of the camera main body 2. Inside the camera main body 2 are disposed a controller 9 made up of a microprocessor or the like for controlling the various operations of the camera, and a removable storage element 12 for storing an image acquired by the imaging element 11.

3: Configuration of Imaging Optical System and Lens Barrel

FIG. 3 is a cross sectional schematic of the configuration of the imaging optical system and the lens barrel 3.

In FIG. 3, the imaging optical system has a first optical system 20 which has a first optical axis A1 and guides light from a subject to the camera main body 2, a bending optical system 22 that is disposed on the first optical axis A1 and bends light guided by the first optical system 20 in a direction along a second optical axis A2 that is perpendicular to the first optical axis A1, and a second optical system 24 that has the second optical axis A2. The imaging element 11 that converts an optical image of a subject emitted by the second optical system into an image signal is provided on the emitting side of the second optical system 24.

The second optical axis A2 is inclined with respect to the front face such that the farther away from the first optical axis A1, the smaller the distance from the front face of the camera main body 2, and is disposed along the Z' axis, which is inclined by the angle α with respect to the Z axis. The first optical system 20 has a first lens group 26 disposed along the first optical axis A1.

The first lens group 26 is, for example, a lens group that overall has negative power, and an objective lens that takes in light from the subject. The bending optical system 22 is, for example, made up of a prism 28 that bends the first optical axis A1 by 90 degrees.

The second optical system 24 has a second lens group 30 disposed close to the prism 28, and a third lens group 32 disposed between the second lens group 30 and the imaging element 11. The second lens group 30 is a zoom lens group, and has a fixed lens 30a and a movable lens group 30b. The third lens group 32 is a focus lens group, and has a fixed lens 32a and movable lens groups 32b and 32c. Light emitted from the third lens group 32 is focused on the imaging element 11 by a lens 34 (an example of an optical element) disposed opposite the third lens group 32.

The lens barrel 3 is a member in the form of a rectangular tube that supports the bending optical system 22 and the first and second optical systems 20 and 24. The lens barrel 3 has a main body part 13 that extends along the second optical axis A2, and a protruding part 14 that extends from the main body part 13 along the first optical axis A1. The second optical system 24 is supported by the main body part 13, and the first optical system 20 is supported by the protruding part 14. The main body part 13 and protruding part 14 are bent at 90 degrees. In between them is formed an inclined part 15 that supports the bending optical system 22.

4: Configuration of Image Blur Correction Device

The image blur correction device 10 has a shake detection sensor (not shown) featuring a gyro sensor or the like and that detects shake in the yaw direction and pitch direction of the camera main body 2, and a lens driving device 33 (an example of the optical element driving device) that drives the lens 34 in two directions according to the detection result of the shake detection sensor. The lens driving device 33 drives the lens 34 in two directions, namely, the X axis positive and negative directions perpendicular to the second optical axis A2 (an example of the second direction; hereinafter referred to as the yaw correction direction) to correct this shake according to the signal from the shake detection sensor, and the Y' axis positive and negative directions (an example of the first direction; hereinafter referred to as the pitch correction direction).

5: Configuration of Lens Driving Mechanism

Figure 4:
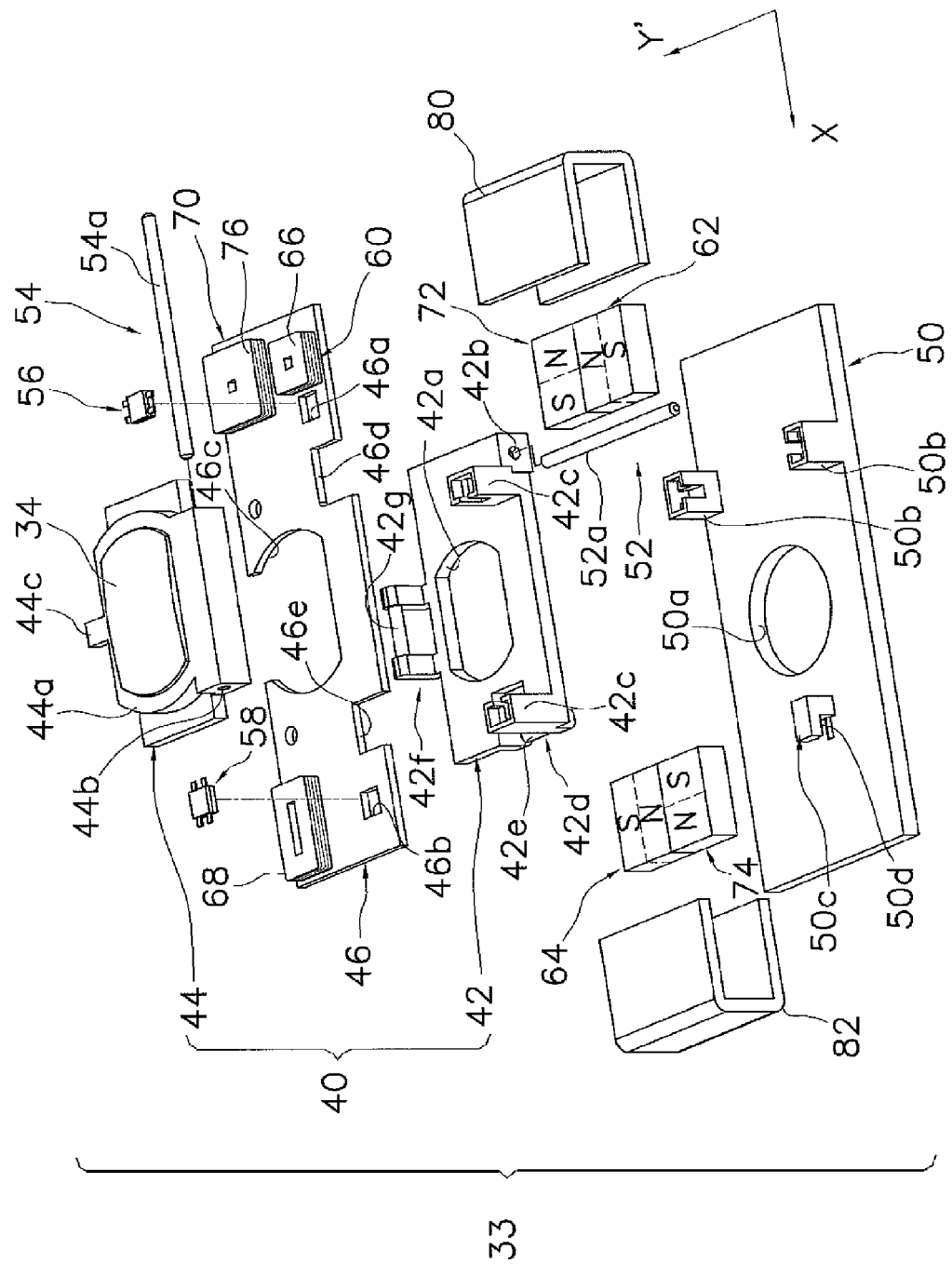
FIG. 4 is an exploded oblique view of a lens driving device according to an embodiment.
Figure 5:
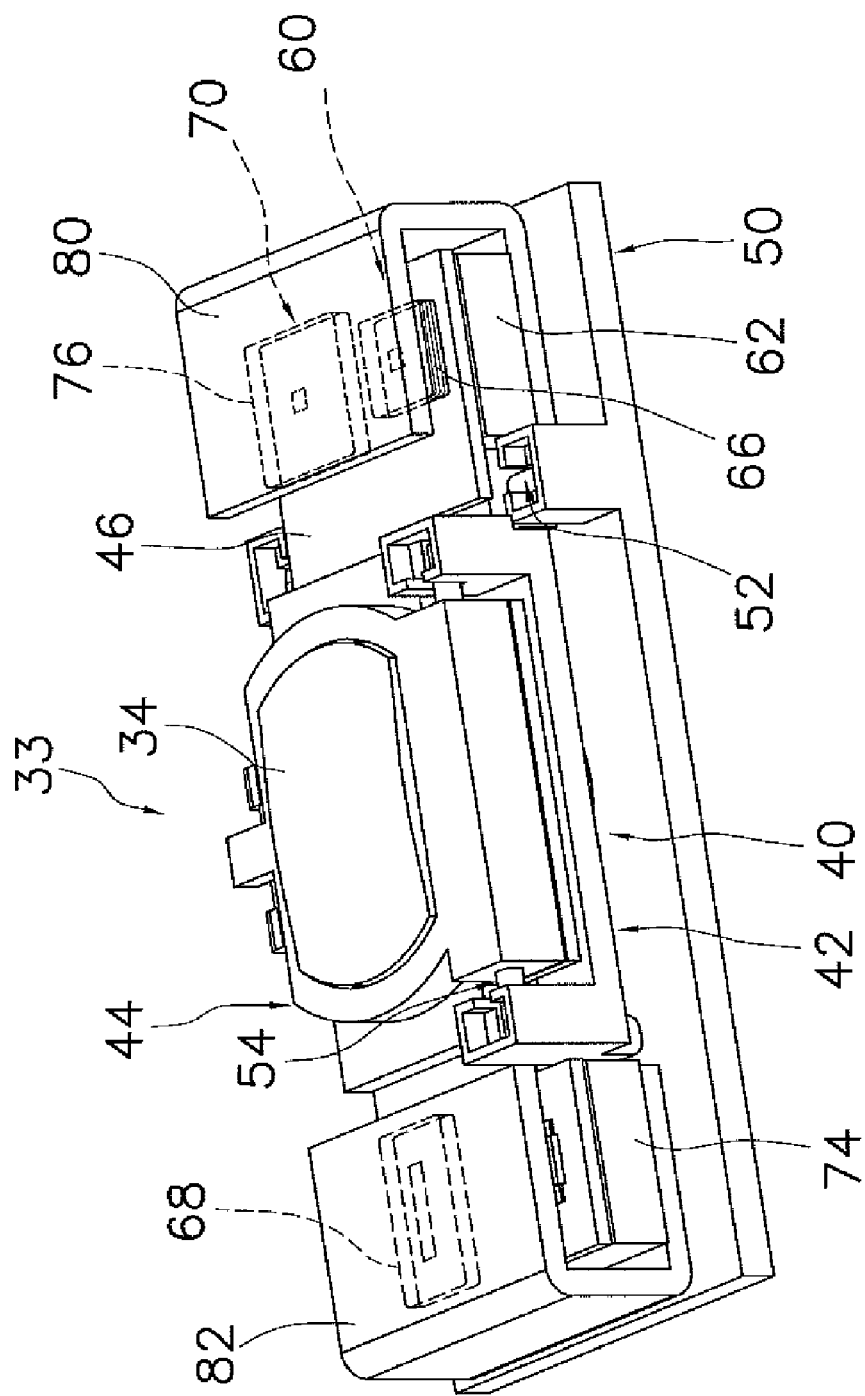
FIG. 5 is an oblique view of a lens driving device.

FIG. 4 is an exploded oblique view of a lens driving device according to an embodiment of the present invention, and FIG. 5 is an oblique view thereof.

The lens driving device 33 has the lens 34, a moving member 40 capable of supporting the lens 34, a stationary member 50 that supports the moving member 40 to allow the moving member to move in the pitch correction direction and the yaw correction direction, a pitch drive mechanism 60 (an example of the first direction drive mechanism) that drives the moving member 40 in the pitch correction direction, and a yaw drive mechanism 70 (an example of the second direction drive mechanism) that drives the moving member in the yaw correction direction. The lens driving device 33 further includes a pitch guide unit 52 (and example of the first guide part) that guides the moving member 40 in the pitch correction direction, a yaw guide unit 54 (an example of the second guide part) that guides the moving member 40 in the yaw direction, a pitch position sensor 56 (an example of the first position sensor) that detects the position of the moving member 40 with respect to the stationary member 50 in the pitch correction direction, and a yaw position sensor 58 that detects the position of the moving member 40 with respect to the stationary member 50 in the yaw correction direction.

The stationary member 50 is a rectangular, substantially flat member that is fixed inside the lens barrel 3. A circular opening 50a through which light imaged by the lens 34 can pass is formed in the approximate center of the stationary member 50. The opening 50a may be elliptical or rectangular. A pair of first support units 50b for supporting the pitch guide unit 52 are formed protruding upward from the stationary member 50. The first support units 50b are disposed spaced apart in the Y' axis direction on a first side (the right side in FIG. 4) in the yaw correction direction. A rotation limiting protrusion 50c is formed protruding upward on the second side in the yaw correction direction and across from the opening 50a. The rotation limiting protrusion 50c receives the load of a pitch movement frame 42 (an example of the first moving frame; discussed below) of the moving member 40, and has a C-shaped rotation limiting groove 50d for limiting the rotation of the pitch movement frame 42 around a pitch guide shaft 52a (discussed below).

The moving member 40 has a pitch movement frame 42 mounted movably in the pitch correction direction on the stationary member 50, a yaw movement frame 44 (an example of the second moving frame) that is mounted movably in the yaw correction direction on the pitch movement frame 42 and that supports the lens 34, and a coil substrate 46 that is fixed to the yaw movement frame 44.

The pitch movement frame 42 is a member roughly in the form of a flat rectangle that is smaller than the stationary member 50. An elliptical opening 42a for transmitting light that passes through the lens 34 is formed in the center of the pitch movement frame 42. The opening 42a may be circular or rectangular. A guide hole 42b through which the pitch guide shaft 52a can pass is formed along the pitch correction direction at a first end (the right end in FIG. 4) of the pitch movement frame 42 in the yaw correction direction. A pair of second support units 42c for supporting the yaw guide unit 54 are formed protruding upward from the top face of the pitch movement frame 42. The second support units 42c are disposed to be spaced apart in the yaw correction direction on a first side (the front side in FIG. 4) of the pitch movement frame 42 in the pitch correction direction. A rotation limiting protrusion 42d having a rotation limiting shaft 42e that engages with the rotation limiting groove 50d is formed protruding downward from a second side (the left side in FIG. 4) of the pitch movement frame 42. As a result, the pitch movement frame 42 is guided in the pitch correction direction by the pitch guide unit 52 and the rotation limiting shaft 42e.

A rotation limiting protrusion 42f is formed protruding upward from a second side (the back side in FIG. 4) of the pitch movement frame 42 in the pitch correction direction. The rotation limiting protrusion 42f receives the load of the yaw movement frame 44 and has a C-shaped rotation limiting shaft 42g for limiting the rotation of the yaw movement frame 44 around a yaw guide shaft 54a (discussed below). This rotation limiting shaft 42g engages with the rotation limiting groove 50d, which limits the rotation of the pitch movement frame 42.

The yaw movement frame 44 is a member roughly in the form of a flat rectangle that is smaller than the pitch movement frame 42. A lens support unit 44a that supports the lens 34 is formed in the center of the yaw movement frame 44. The lens 34 is roughly elliptical in shape, obtained by cutting off two circular sides in parallel. The major axis direction of the lens 34 is disposed along the yaw correction direction.

A guide hole 44b through which the yaw guide shaft 54a can pass is formed along the yaw correction direction at a first end (the front end in FIG. 4) of the yaw movement frame 44 in the pitch correction direction. A rotation limiting protrusion 44c having a C-shaped rotation limiting groove (not shown) for limiting the rotation of the yaw movement frame 44 around the yaw guide shaft 54a is formed protruding rearward in FIG. 4 at a second end (the back end in FIG. 4) of the yaw movement frame 44 in the pitch correction direction. The rotation limiting shaft 42g engages with this rotation limiting groove. As a result, the yaw movement frame 44 is guided in the yaw correction direction by the yaw guide unit 54 and the rotation limiting shaft 42g.

The coil substrate 46 is a roughly rectangular circuit substrate for mounting first and second coils 66 and 68 (examples of the first and second driven units; discussed below) constituting the pitch drive mechanism 60, a third coil 76 (an example of the third driven part; discussed below) constituting the yaw drive mechanism 70, and the pitch position sensor 56 and the yaw position sensor 58. The coil substrate 46 is fixed to the yaw movement frame 44 by a suitable fixing means such as adhesive bonding or screws. Rectangular attachment holes 46a and 46b for attaching the pitch position sensor 56 and the yaw position sensor 58 are formed in the coil substrate 46. An elliptical first cut-out 46c for transmitting light that has been imaged by the lens 34 is formed in the approximate center portion. Second and third cut-outs 46d and 46e for making room for the second support units 42c are disposed to be spaced apart in the yaw correction direction at a first end (the front end in FIG. 4) of the coil substrate 46. The second and third cut-outs 46d and 46e are made larger than the dimensions of the second support units 42c in the yaw correction direction so as not to interfere with the second support units 42c when the yaw movement frame 44 moves in the yaw correction direction. An attachment hole 46a for attaching the pitch position sensor 56 is formed on the outer side of the second cut-out 46d in the yaw correction direction, and an attachment hole 46b for attaching the yaw position sensor 58 is formed on the outer side of the third cut-out 46e in the yaw correction direction.

Figure 6:
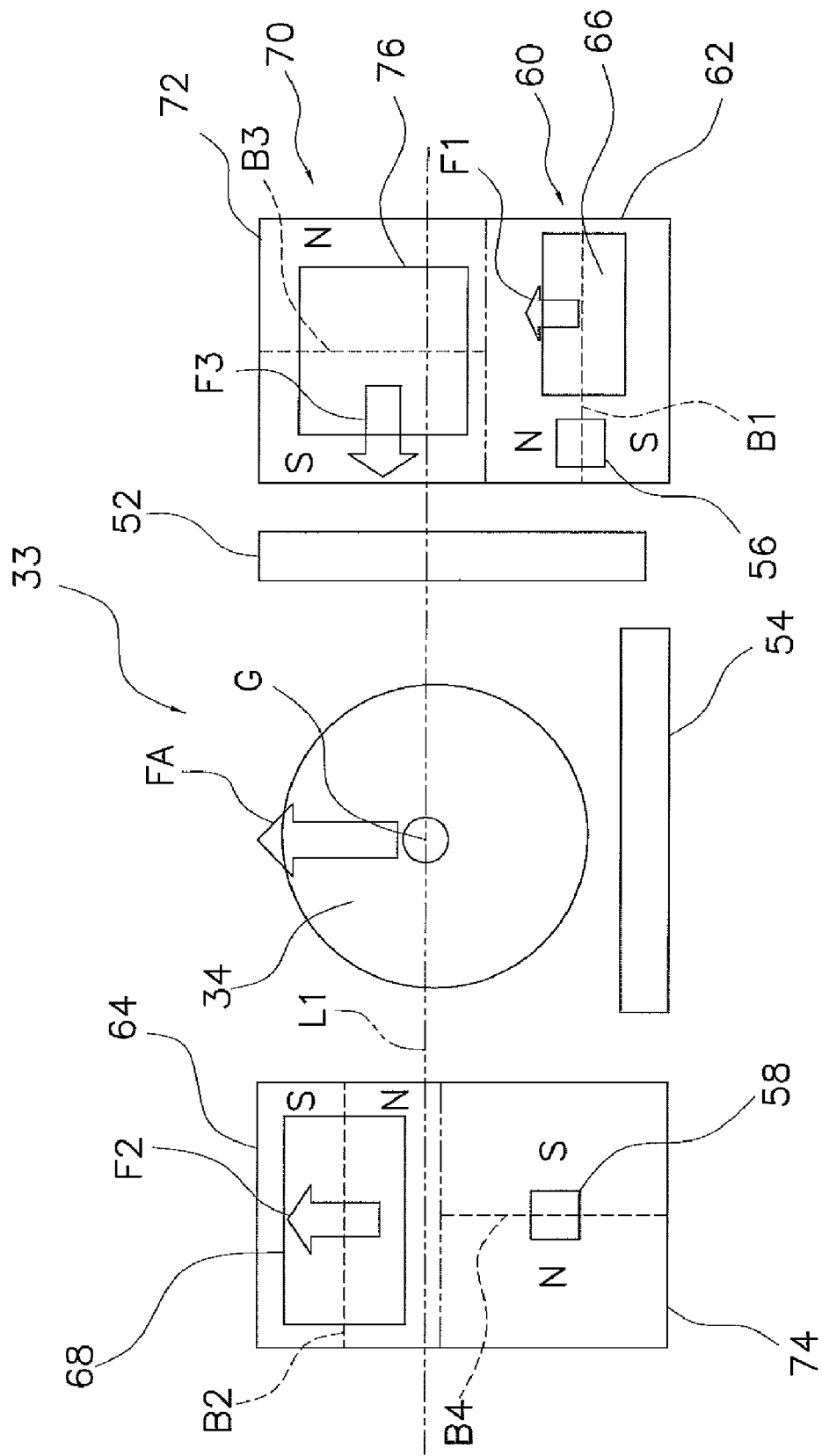
FIG. 6 is a plan view schematic illustrating the layout of the drive system in a lens driving device.

As shown schematically in FIG. 6, the pitch drive mechanism 60 has first and second magnets 62 and 64 (examples of the first and second drive parts) fixed to the stationary member 50, and first and second coils 66 and 68 fixed to the coil substrate 46 at positions that can correspond to the first and second magnets 62 and 64. The yaw drive mechanism 70 has a third magnet 72 (an example of the third drive part) fixed to the stationary member 50, and a third coil 76 fixed to the coil substrate 46 at a position that can correspond to the third magnet 72.

The first magnet 62 and the third magnet 72 are formed integrally. Also, in this embodiment the second magnet 64 is formed integrally with a fourth magnet 74 used not for yaw drive, but for detecting by the yaw position sensor 58. The integrally formed first and third magnets 62 and 72 and the second and fourth magnets 64 and 74 are disposed to be spaced apart in the yaw correction direction and arranged on opposite sides of the lens 34. Also, as shown in FIGS. 4 and 5, the first and third magnets 62 and 72 and the first and third coils 66 and 76 are covered on three sides (top, bottom, and outside) by a C-shaped first yoke 80, and the second and fourth magnets 64 and 74 and the second coil 68 are covered on three sides (top, bottom, and outside) by a C-shaped second yoke 82. These two yokes 80 and 82 have the same shape, which reduces the number of parts that are needed.

As shown in FIG. 6, the first and second magnets 62 and 64 are magnetized to different magnetic poles at first and second boundaries B1 and B2 parallel to the yaw correction direction, and the third and fourth magnets 72 and 74 are magnetized to different magnetic poles at third and fourth boundaries B3 and B4 parallel to the pitch correction direction. More specifically, the inside of the first magnet 62 in the pitch correction direction (the side closer to the third magnet 72) is magnetized to the N pole, while the outside is magnetized to the S pole. The second magnet 64 is disposed at a diagonally opposite position of the coil substrate 46 arranged on opposite sides of the lens 34 and on the other side from the first magnet 62, that is, arranged on opposite sides of a first imaginary line L1, and similarly the inside is magnetized to the N pole and the outside to the S pole. The inside of the third magnet 72 in the yaw correction direction (the side closer to the lens 34) is magnetized to the S pole, and the outside is magnetized to the N pole. The fourth magnet 74 is disposed at a diagonally opposite position of the coil substrate 46 arranged on opposite sides of the lens 34 and on the other side from the third magnet 72, and similarly the inside is magnetized to the S pole and the outside to the N pole. Disposing these four magnets, 62, 64, 72, and 74 in this way makes it possible to use magnets in which the structure is the same between a magnet unit in which the first and third magnets 62 and 72 are integrally formed, and a magnet unit in which the second and fourth magnets 64 and 74 are integrally formed.

With these two magnet units, the boundary between the first magnet 62 (or the second magnet 64) and the third magnet 72 (or the fourth magnet 74) is indicated by a two-dot chain line in the drawing, but this boundary between magnets is only illustrative in nature, and actually the first magnet 62 (or the second magnet 64) and the third magnet 72 (or the fourth magnet 74) have three magnetic poles formed in a single magnet unit. Therefore, the N pole of the first magnet 62 (or the second magnet 64) and the N pole of the third magnet 72 (or the fourth magnet 74) are simultaneously formed by magnetization in an L-shape.

The first to third coils 66, 68, and 76 are wound with their center being an axis parallel to the second optical axis A2. The first coil 66 is fixed to the coil substrate 46 such that when the pitch movement frame 42 and the yaw movement frame 44 are disposed at a reference position where the center of the lens 34 is located at the center of the second optical axis A1, the center (drive center) is located on the first boundary B1. The second coil is fixed to the coil substrate 46 such that when the pitch movement frame 42 and the yaw movement frame 44 are disposed at a reference position, the center (drive center) is located on the second boundary B2. The third coil 76 is fixed to the coil substrate 46 such that when the pitch movement frame 42 and the yaw movement frame 44 are disposed at the reference position, the center is located on the third boundary B3. When the coil substrate 46 is viewed in the Z' axis direction (an example of the third direction), that is, from above, the first coil 66 and the second coil 68 are disposed arranged on opposite sides of the lens 34 and spaced apart in the yaw correction direction. Further, the first coil 66 and the second coil 68 are arranged on opposite sides of the first imaginary line L1, which passes through the center of gravity G of the portion that moves, including the moving member 40, and is parallel to the yaw correction direction.

The center of gravity G of the moving portion referred to here is the center of gravity that combines the centers of gravity of the lens 34, the yaw movement frame 44, the coil substrate 46, the first to third coils 66, 68, and 76, the yaw guide unit 54, and the pitch and yaw position sensors 56 and 58, and in this embodiment, the center of gravity G overlaps the lens 34 when viewed from above (the Z' axis direction).

Figure 7:
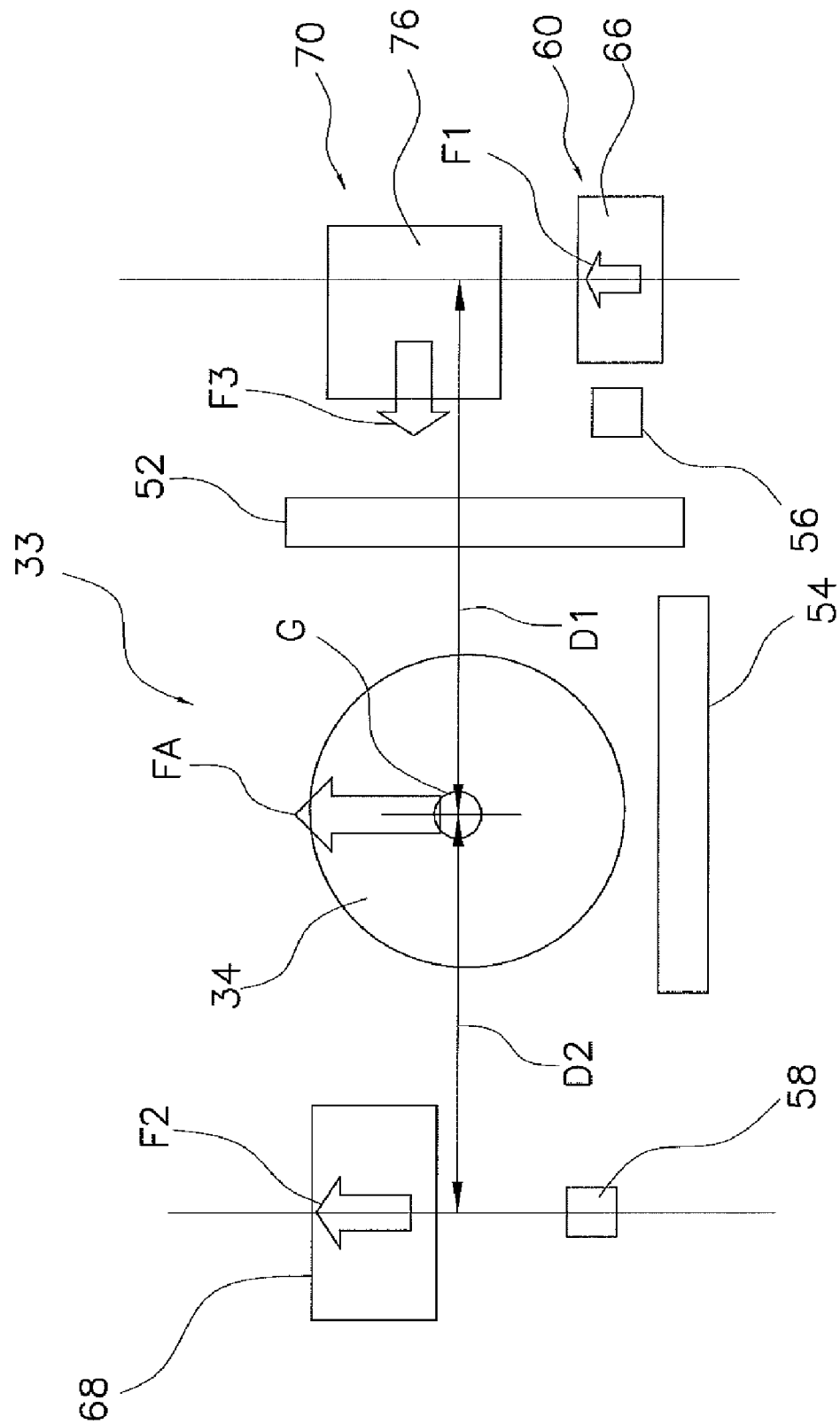
FIG. 7 is a plan view schematic illustrating the moment of a lens driving device.

The third coil 76 is arranged on the same side as the first coil 66, and is disposed in the pitch correction direction. Also, the third coil 76 is disposed closer to the first imaginary line L1 than the first coil 66. The number of windings of the first coil 66 is less than the number of windings or the winding diameter of the second coil 68, and the drive force thereof is smaller. Furthermore, as shown in FIG. 7, the positions of the first coil 66 and the second coil 68 are determined so that, in the moment around the center of gravity G of the moving portion, a first moment that acts on the first coil 66 under the drive force of the first magnet 62 (FIG. 6) (that is, the product of the drive force acting on the center of the first coil 66 (the scalar value of a drive vector F1) and the distance D1 between the center of gravity G and the center of the first coil 66 in a direction perpendicular to the drive vector F1) and a second moment that acts on the second coil under the drive force of the second coil 68 (that is, the product of the drive force acting on the center of the second coil 68 (the scalar value of a drive vector F2) and the distance D2 between the center of gravity G and the center of the second coil 68 in a direction perpendicular to the drive vector F2) substantially cancel each other out. The meaning of the phrase "the first moment and the second moment substantially cancel each other out" here includes not only that the two moments completely cancel each other out, but also that they are canceled out to the extent that they do not affect the movement of the pitch movement frame 42 by the first and second coils 66 and 68.

When the two coils 66 and 68 are disposed in these positions, near the center of gravity G a combined drive vector FA, which is a combination of the drive vectors F1 and F2 acting on the first coil 66 and the second coil 68, faces in the pitch correction direction.

As shown in FIGS. 4 and 6, the pitch guide unit 52 guides the pitch movement frame 42 of the moving member 40 in the pitch correction direction with respect to the stationary member 50. The pitch guide unit 52 is arranged on the same side as the first magnet 62 in the yaw correct direction. The pitch guide unit 52 has the pitch guide shaft 52a, the ends of which are supported by the pair of first support units 50b. Therefore, the pitch guide shaft 52a is disposed along the pitch correction direction between the lens 34 and the first magnet 62. The pitch guide shaft 52a is fixed by a suitable fixing means, such as adhesive bonding, to the pair of first support units 50b.

The yaw guide unit 54 guides the yaw movement frame 44 of the moving member 40 in the yaw correction direction. The yaw guide unit 54 is disposed on the pitch movement frame 42 at a position that does not overlap with the third magnet 72 in the pitch correction direction. More specifically, the yaw guide unit 54 has the yaw guide shaft 54a, the ends of which are supported by the pair of second support units 42c of the pitch movement frame 42. Therefore, the yaw guide shaft 54a is disposed along the yaw correction direction more to the front side in FIG. 4 than the lens 34. The yaw guide shaft 52a is fixed by a suitable fixing means, such as adhesive bonding, to the pair of second support units 42c.

The pitch position sensor 56 makes use, for example, of a magnetic sensor capable of detecting the relative position with respect to the first magnet 62. As shown in FIG. 6, the pitch position sensor 56 is arranged on the same side as the first magnet 62 with respect to the lens 34. More specifically, the pitch position sensor 56 is disposed between the pitch guide unit 52 and the first coil 66 so that its center is located at the first boundary B1 of the first magnet 62. Therefore, the first magnet 62 functions as a drive unit for the lens 34 and also functions to detect the position of the pitch movement frame 42, and is shared by the first coil 66 and the pitch position sensor 56.

The yaw position sensor 58 makes use, for example, of a magnetic sensor capable of detecting the relative position with respect to the fourth magnet 74. As shown in FIG. 6, the yaw position sensor 58 is disposed on the opposite side from the pitch position sensor 56 with respect to the lens 34. More specifically, the yaw position sensor 58 has its center located at the fourth boundary B4 of the fourth magnet 74, and is disposed closer to the yaw guide unit 54.

6: Operation of Lens Driving Mechanism

The lens driving device 33 is controlled according to the output from a shake detection sensor. When shake caused by hand shake or the like is detected in the pitch or yaw direction of the camera main body 2, current corresponding to the detection result from the shake detection sensor is sent from the controller 9 to the first to third coils 66, 68, and 76, and the lens 34 is driven in the pitch correction direction and the yaw correction direction to eliminate image blur caused by shake.

When current is supplied in a specific direction to the third coil 76, an electromagnetic force expressed by a drive vector F3 in FIG. 7, for example, is generated, and the yaw movement frame 44, including the lens 34, moves from the reference position along the yaw guide unit 54. Meanwhile, when current is supplied in a specific direction simultaneously to the first and second coils 66 and 68, electromagnetic forces expressed, for example, by the drive vector FT and the drive vector F2, respectively, are generated, and the lens 34, the yaw guide unit 54, the yaw movement frame 44, and the pitch movement frame 42 move integrally along the pitch guide unit 52. When current is supplied in the opposite direction, the pitch movement frame 42 and the yaw movement frame 44 move the opposite way in the pitch correction direction and the yaw correction direction.

Here, because the third coil 76 is disposed such that the center of gravity G is near an extension line of the drive vector F3 of the third coil 76, the rotational moment imparted to the portion moving in the yaw correction direction is reduced. This allows the sliding resistance generated by the yaw guide unit 54 to be reduced and the lens 34 to be driven very accurately in the yaw correction direction.

Meanwhile, since the first and second coils 66 and 68 are disposed such that the center of gravity G is on an extension line of the combined drive vector FA, which is a combination of the drive vector F1 of the first coil 66 and the drive vector F2 of the second coil 68, less rotational moment is imparted to the moving portion, the sliding resistance generated by the pitch guide unit 52 is reduced, and the lens 34 can be driven very accurately in the pitch correction direction.

7: Effect of the Embodiment 7.1

Since the first coil 66 and the second coil 68 are arranged on opposite sides of the lens 34 as the driven units of the pitch drive mechanism 60, the lens 34 can be driven on both sides thereof. Accordingly, even if the drive centers of the first and second coils 66 and 68 should diverge from the center of gravity G of the moving portion, the first coil 66 and the second coil 68 can be disposed so that the two moments acting on the first and second coils 66 and 68 around the center of gravity G will cancel each other out. This allows the lens 34 to be driven accurately.

Also, since the third coil 76 is arranged on the same side as the first coil 66, the third coil 76 can be disposed close to the first coil 66, and this reduces the size in the pitch correction direction. Accordingly, if the pitch correction direction is the thickness direction of the camera main body 2, the camera main body 2 can be made thinner.

In particular, with a lens barrel 3 in which a bending optical system is used, since constituent members such as a focus or zoom actuator are disposed on both sides of the optical system in the yaw correction direction, with the lens driving device 33, the size of the lens barrel 3 in its thickness direction can be reduced by disposing the first and second coils 66 and 68 that drive the lens 34 in the pitch correction direction on both sides of the lens 34 in the yaw correction direction.

7.2

Since the first moment acting on the first coil 66 and the second moment acting on the second coil 68 act in directions that substantially cancel each other out, near the center of gravity G the combined drive vector for the two coils 66 and 68 tends to face in the pitch correction direction. Accordingly, the lens 34 tends to be driven more accurately in the correction direction.

7.3

Because the first moment acting on the first coil 66 and the second moment acting on the second coil 68 substantially cancel each other out, the combined drive vector FA of the two coils 66 and 68 act in the same pitch correction direction near the center of gravity G. Accordingly, it is less likely that a jerky motion will result from an increase in sliding resistance, and the lens 34 can be driven even more accurately in the pitch correction direction.

7.4

Since the drive force of the first coil 66 is smaller than the drive force of the second coil 68, the first coil 66 can be smaller in size than the second coil 68. Accordingly, the overall size can be reduced even if the first coil 66 is disposed aligned with the third coil 76. Also, if the first coil 66 is disposed farther away from the center of gravity G than the second coil 68, the layout can be such that the moments around the center of gravity substantially cancel each other out, and the pitch guide unit 52 that guides the moving member 40 can be disposed more easily between the lens 34 and the first coil.

7.5

The third coil 76 is disposed closer to the first imaginary line L1 than the first coil 66. Accordingly, the center of gravity G can be disposed close to an extension line of the drive vector F3 of the third coil 76 for driving the yaw movement frame 44 in the yaw correction direction, the moment around the center of gravity is smaller, and the lens 34 can be driven accurately even in the yaw correction direction.

7.6

When viewed from above, the first and second coils 66 and 68 are provided arranged on opposite sides of the first imaginary line L1. In this case, since the first and second coils 66 and 68 are disposed on both sides of the first imaginary line L1, the moving member 40 has better weight balance, the center of gravity G can be moved more to the lens 34 side, and the lens driving device 33 can be efficiently disposed in the space within the camera main body 2.

7.7

Since the first coil 66 and the third coil 76 are disposed aligned in the pitch correction direction, the lens driving device 33 can be smaller in the yaw correction direction.

7.8

Since the pitch guide unit 52 that guides the moving member 40 in the pitch correction direction is disposed between the center of gravity G and the first coil 66 for moving the moving member 40 in the pitch correction direction, the center of gravity G can be disposed more to the pitch guide unit 52 side than the first coil 66. Accordingly, jerkiness produced by sliding resistance generated in the pitch guide unit 52 can be reduced, and the lens 34 driven more accurately.

7.9

Since the pitch position sensor 56 that detects the position of the moving member 40 in the pitch correction direction with respect to the stationary member 50 is arranged on the same side as the first coil 66 with respect to the lens 34, the pitch position sensor is disposed close to the pitch guide unit 52. Accordingly, the pitch position sensor 56 can move more smoothly, and the detection accuracy of the pitch position sensor 56 can be stabilized.

Also, since the pitch position sensor 56 is disposed near the first coil 66, the first magnet 62 can also be used for position detection, meaning that the first magnet 62 can serve both for drive and for detection, which reduces the number of parts required.

7.10

When viewed from above, the center of gravity G overlaps the lens 34, so there is less fluctuation in the size of the first coil 66 and the second coil 68, and less protrusion in the yaw correction direction.

7.11

The lens 34 can be driven quietly, quickly, and accurately by a linear actuator made up of the magnets 62, 64, and 72 and the coils 66, 68, and 76. Also, since the coils 66, 68, and 76, which are lighter in weight than the magnets 62, 64, and 62, are provided to the moving member 40, the moving portion can be more lightweight, which reduces power consumption.

7.12

The first magnet 62 and the third magnet 72 are integrally formed, the first magnet 62 is magnetized to a different magnetic pole at a first boundary B1 parallel to the yaw correction direction, and the third magnet 72 is magnetized to a different magnetic pole are arranged on opposite sides of the third boundary B3 parallel to the pitch correction direction, so the first and third coils 66 and 72 can be moved in the pitch correction direction and the yaw correction direction are arranged on opposite sides of the first boundary B1 and the third boundary B3, respectively. Also, if a magnet the same as one obtained by integrally forming the first and third magnets 62 and 72 is disposed to be rotated to the opposite side of the lens 34, the portion where the first magnet 62 is formed can be used as the second magnet 64. Accordingly, the magnets are shared in the lens driving device 33, and this reduces the cost.

7.13

When there is further provided a fourth magnet 74, which is magnetized to a different pole at the fourth boundary B4 parallel to the pitch correction direction, and is provided on the other side with respect to the lens 34, and when the first magnet 62 and the second magnet 64 are arranged on opposite sides of the first imaginary line L1, the fourth magnet 74 does not function as a drive unit, but magnets can be used in which the structure is exactly the same between a magnet in which the first and third magnets 62 and 72 are integrally formed, and a magnet in which the second and fourth magnets 64 and 74 are integrally formed. This allows the magnets to be shared and lowers the cost.

7.14

Since the yaw guide unit 54 is provided for guiding the yaw movement frame 44, and the yaw guide unit 54 is disposed so as not to overlap with the third coil 76 in the pitch correction direction, the center of gravity G can be closer to the third coil 76, and the lens 34 can be driven even more accurately in the yaw correction direction.

8: Other Embodiments

The lens driving mechanism according to the present invention is not limited to the embodiment given above, and various changes and modifications are possible without departing from the gist of the present invention.

(8.1)

Figure 8:
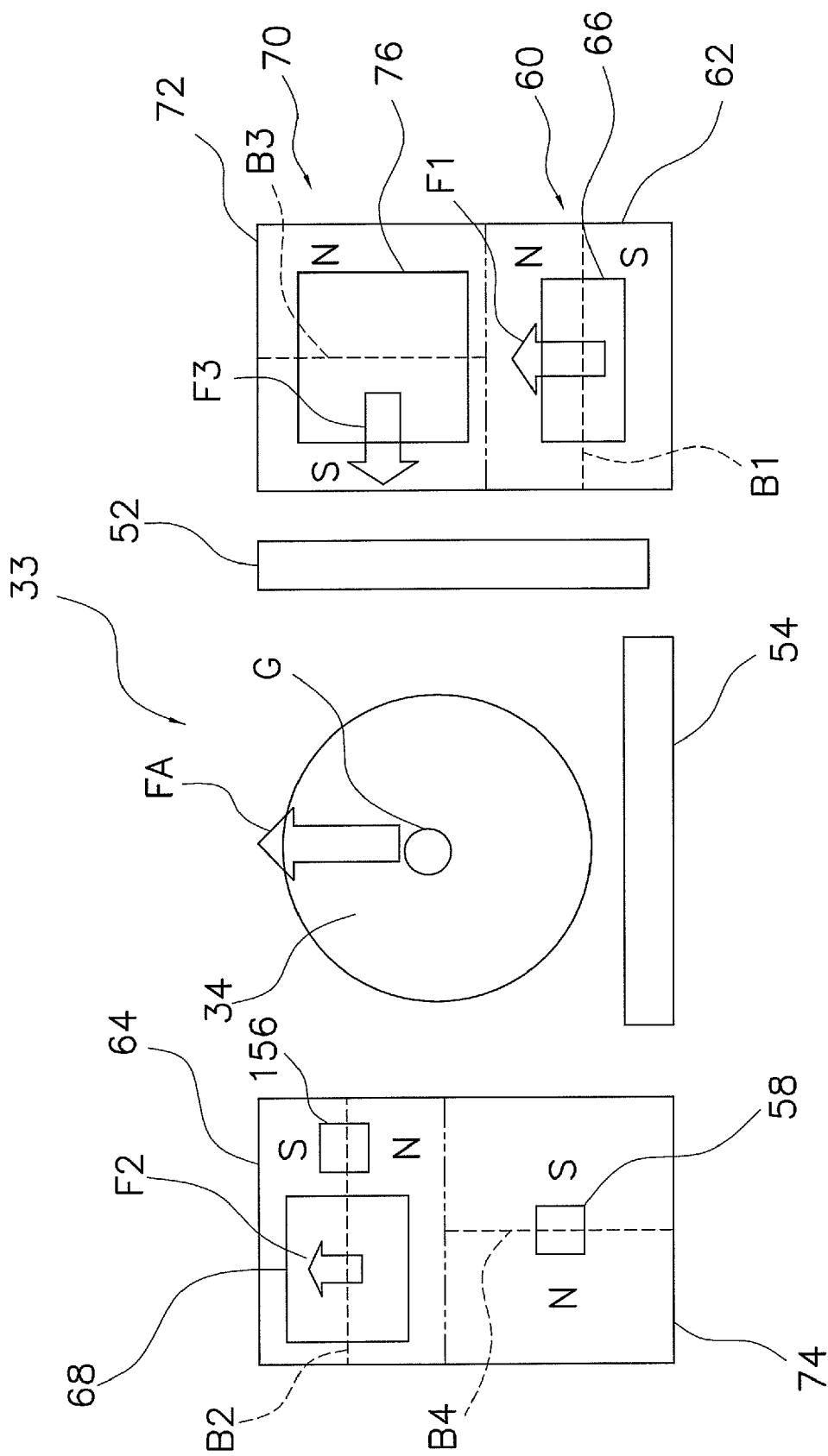
FIG. 8 is a plan view schematic illustrating the lens driving device in another embodiment.

As shown in FIG. 8, a pitch position sensor 156 may be disposed at the second boundary B2 of the second magnet 64. In this case, since the pitch position sensor 156 and the yaw position sensor 58 are arranged on the same side with respect to the lens 34, wiring to the sensors 156 and 58 can be installed more easily. The rest of the constitution is the same as that in the above embodiment, and will therefore not be described again.

(8.2)

Figure 9:
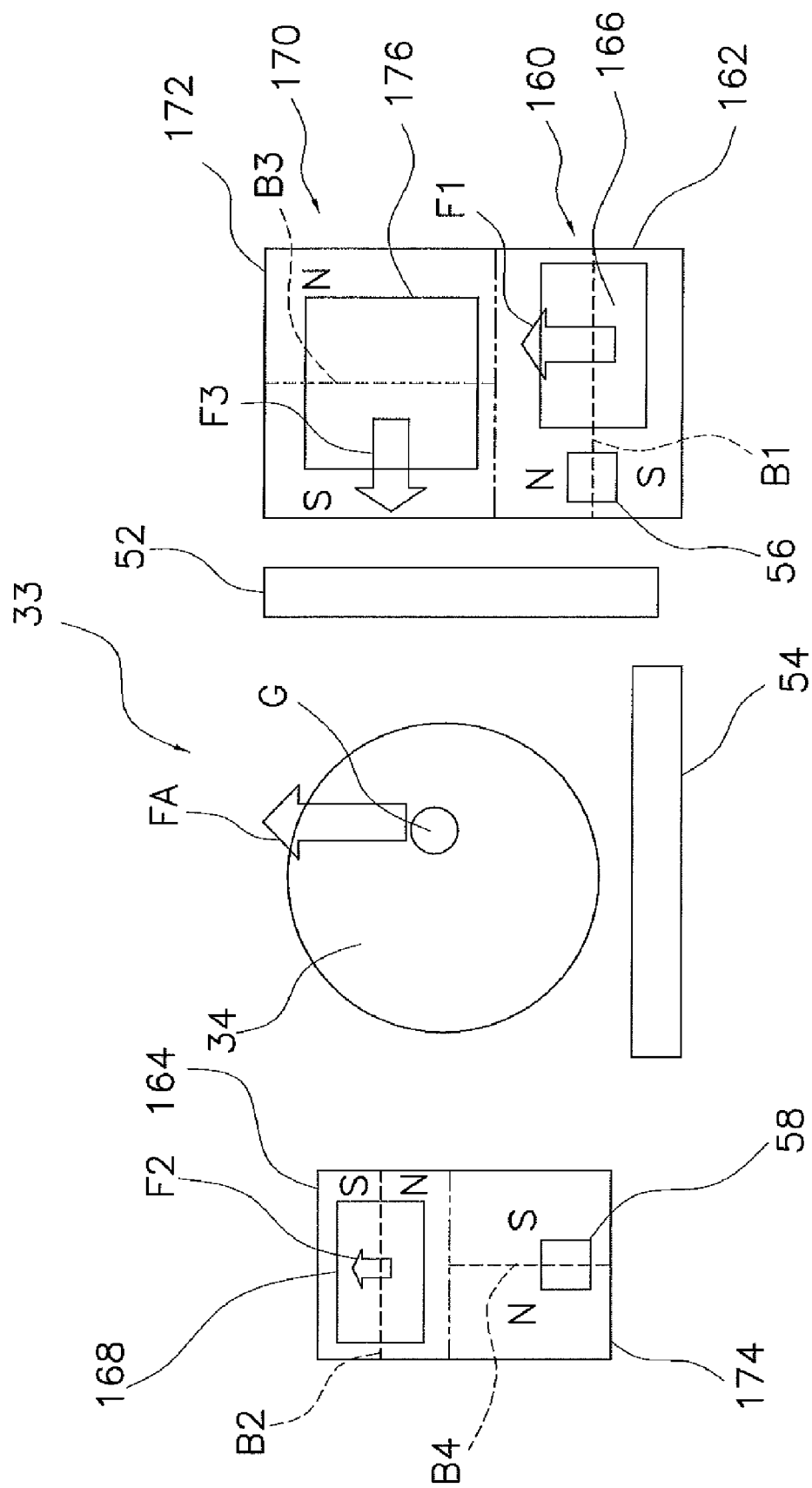
FIG. 9 is a plan view schematic of the lens driving device in yet another embodiment.

As shown in FIG. 9, in a pitch drive mechanism 160 and a yaw drive mechanism 170, the size of a magnet unit on the right side of first and second magnets 162 and 172 arranged on opposite sides of the lens 34 may be different from that of a magnet unit on the left side of second and fourth magnets 164 and 174. In FIG. 9, the magnet unit of the first magnet 162 and the third magnet 172 on the right side of the pitch guide unit 52 is larger in size than the magnet unit of the second magnet 164 and the fourth magnet 174 on the left side, and a first coil 166 is larger than a second coil 168. In this case, the position of the center of gravity G moves toward the larger magnet unit on the right side, and the center of gravity G is located closer to the pitch guide unit 52. Here again, the first and second coils 166 and 168 are disposed so that the first and second moments will cancel each other out.

When the sizes on both sides of the lens 34 are thus made different, it is more difficult for parts to be shared, but since the center of gravity G and the combined drive vector are closer to the pitch guide unit 52 side, less sliding resistance will be generated at the pitch guide unit 52, +s the lens 34 can be driven more accurately.

(8.3)

Figure 10:
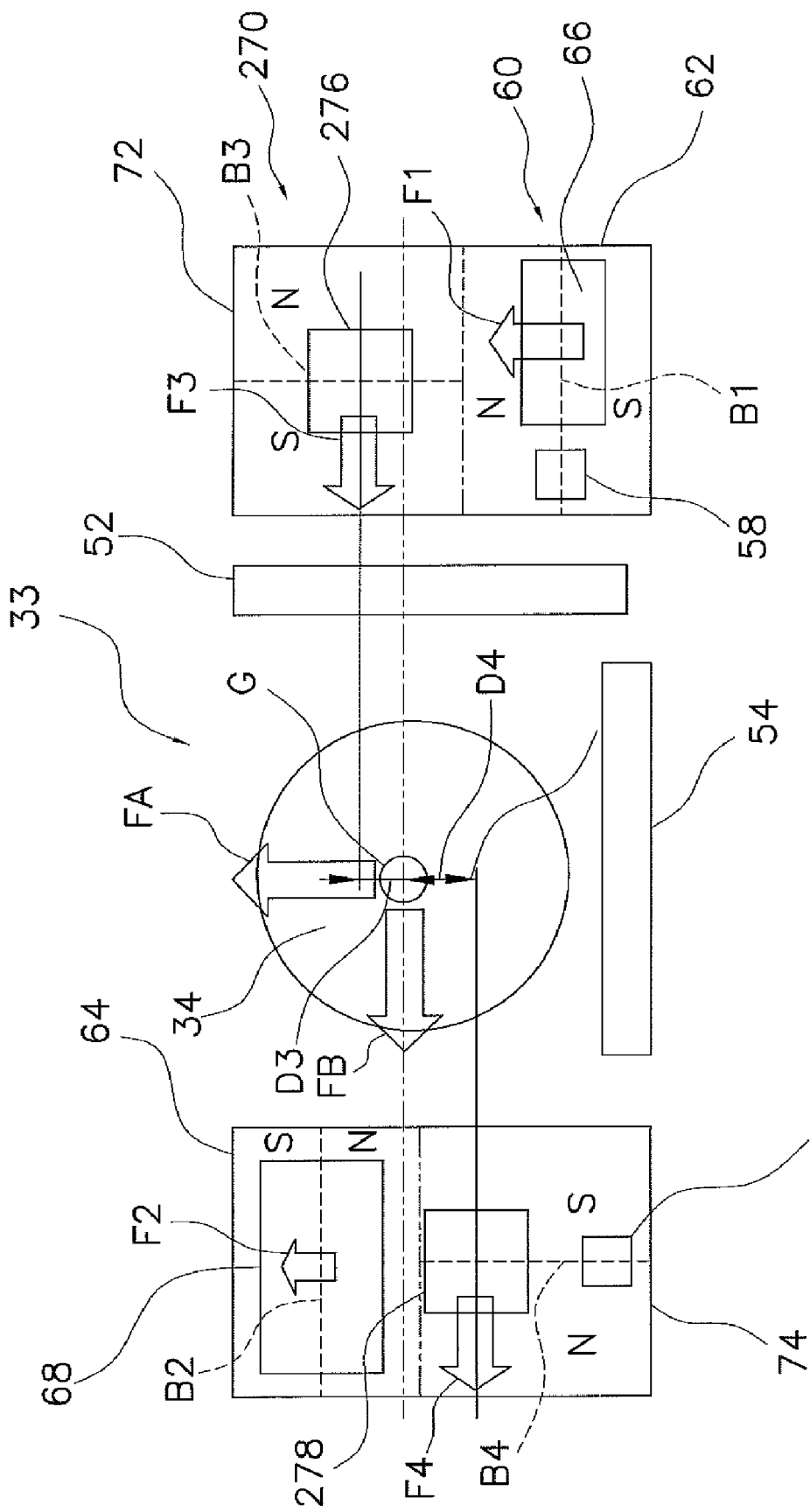
FIG. 10 is a plan view schematic of the lens driving device in yet another embodiment.

As shown in FIG. 10, a fourth coil 278 may be disposed on the coil substrate 46 opposite the fourth magnet 68, and two coils 276 and 278 may be provided to a yaw drive mechanism 270. The fourth coil 278 is disposed so that its center is located at the fourth boundary B4 of the fourth magnet 74. The rest of the constitution is the same as that in the above embodiment, and will therefore not be described again.

In this case, not only with the pitch drive mechanism 60, but also with the yaw drive mechanism 270, the fourth coil 278 is disposed as a fourth driven unit on the second coil 68 side arranged on opposite sides of the lens 34, and the moving member 40 can be driven by two magnets and coils on both sides of the lens 34, so the thickness is reduced and the lens can be driven even more accurately in the yaw correction direction as well.

Furthermore, in this case again, the positions of a third coil 276 and the fourth coil 278 are determined so that, in the moment around the center of gravity G of the moving portion, a third moment that acts on the third coil 276 under the drive force of the third magnet 72 (FIG. 6) (that is, the product of the drive force acting on the center of the third coil 276 (the scalar value of a drive vector F3) and the distance D3 between the center of gravity G and the center of the third coil 276) and a fourth moment that acts on the fourth coil 278 under the drive force of the fourth coil 278 (that is, the product of the drive force acting on the center of the fourth coil 278 (the scalar value of a drive vector F4) and the distance D4 between the center of gravity G and the center of the fourth coil 278) substantially cancel each other out.

(8.4)

In the above embodiment, a linear actuator including magnets and coils is used as the pitch and yoke drive mechanism, but the present invention is not limited to this. For example, a stepping motor, a lead screw, or the like may be used for linear drive, or a piezoelectric element or the like may be used.

(8.5)

In the above embodiment, two coils are provided for pitch drive, but the number of coils is not limited to two, and may be any number greater than or equal to two. In this case, the number of magnetic poles is determined according to the number of coils.

(8.6)

In the above embodiment, C-shaped first and second yokes 80 and 82 having the same shape are provided to form the magnetic circuit more efficiently, but if an adequate magnetic circuit can be formed with magnets alone, the yokes need not be provided. Also, the first and second yokes may be constituted by a first portion disposed on the bottom face of the magnet and a second portion disposed on the top face of the magnet, and may have a separated configuration in which no connecting portion is provided for connecting the two portions. In this case, not providing the connecting portion affords a corresponding reduction in the size in the yaw correction direction.

(8.7)

In the above embodiment, the pitch movement frame 42 and the yaw movement frame 44 are guided by shafts in the pitch and yaw guide units 52 and 54, but guide units that make use of balls may be used instead. However, a guide unit that makes use of a guide shaft is easier to assemble and allows the movement frame to be guided stably both in the pitch correction direction and in the yaw correction direction.

(8.8)

In the above embodiment, the lens 34 is driven as an optical element, but the constitution may instead be such that the imaging element 11 is driven. Also, the reflecting mirror of prism of a bending optical system may be driven.

(8.9)

In the above embodiment, the lens barrel 3 and the second optical system 24 are disposed at an angle to the front face of the camera main body 2, which reduced the thickness of the lens barrel 3 in addition to that of the lens driving device 33, and further reduced the thickness of the camera main body 2. However, the lens driving device and imaging apparatus according to the present invention are not limited to having an inclined lens barrel and second optical system, and the lens barrel and the second optical system may instead be disposed parallel to the front face of the camera main body.

(8.10)

In the above embodiment, the drive force is varied with the size of the coils when two coils are provided to the pitch and yaw drive mechanisms, but the drive force may instead be varied by varying the current that is applied to the coils.

GENERAL INTERPRETATION OF TERMS

In understanding the scope of the present invention, the term "configured" as used herein to describe a component, section, or part of a device includes hardware and/or software that is constructed and/or programmed to carry out the desired function.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms "including," "having," and their derivatives. Also, the terms "part," "section," "portion," "member," or "element" when used in the singular can have the dual meaning of a single part or a plurality of parts.

Terms that are expressed as "means-plus function" in the claims should include any structure that can be utilized to carry out the function of that part of the present invention. Finally, terms of degree such as "substantially," "about," and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. An optical element driving device comprising:
   at least one optical element;
   a moving member configured to support the optical element;
   a stationary member configured to support the moving member to be movable in a first direction and a second direction intersecting the first direction;
   a first direction drive mechanism having first and second drive parts provided to the stationary member, and first and second driven parts provided to the moving member and movable upon receiving a drive force from the first and second drive parts, and the first direction drive mechanism configured to drive the moving member in the first direction; and
   a second direction drive mechanism having a third drive part provided to the stationary member, and a third driven part provided to the moving member and movable upon receiving a drive force form the third drive part, and the second direction drive mechanism configured to drive the moving member in the second direction,
   the first and second driven parts arranged on opposite sides of the optical element when viewed in a third direction perpendicular to the first and second directions, and
   the third driven part arranged on the same side of the optical element as the first driven part when viewed in the third direction.

2. The optical element driving device according to claim 1, wherein, near a center of gravity of a portion of the optical element driving device that moves including the moving member
   a first moment that acts on the first driven part upon receiving the drive force of the first drive part and a second moment that acts on the second driven part upon receiving the drive force of the second drive part both act to substantially cancel each other out.

3. The optical element driving device according to claim 2, wherein the first moment and the second moment completely cancel each other out.

4. The optical element driving device according to claim 3, wherein the drive force of the first drive part is smaller than the drive force of the second drive part.

5. The optical element driving device according to claim 4, wherein the third driven part is disposed closer than the first driven part to a first imaginary line parallel to the second direction and passing through the center of gravity.

6. The optical element driving device according to claim 5, wherein the first and second driven parts are provided on opposite sides of the first imaginary line when viewed in the third direction.

7. The optical element driving device according to claim 6, wherein the third driven part is disposed to be aligned with the first driven part in the first direction.

8. The optical element driving device according to claim 7, further comprising a first guide part disposed between the center of gravity and the first driven part in the second direction, and configured to guide the moving member in the first direction with respect to the stationary member.

9. The optical element driving device according to claim 8, further comprising a first position sensor arranged on the same side of the optical element as the first driven part, and configured to detect the position of the moving member in the first direction with respect to the stationary member.

10. The optical element driving device according to claim 9, wherein the center of gravity overlaps the optical element when viewed in the third direction.

11. The optical element driving device according to claim 10, wherein the first and second direction drive mechanisms are electromagnetic linear actuators, the first, second and third driven parts have first, second and third coils provided to the moving member, respectively, and the first, second and third drive parts have first, second and third magnets provided to the stationary member to be capable of being disposed opposite to the first, second and third coils, respectively.

12. The optical element driving device according to claim 11, wherein the first magnet and the third magnet are formed integrally, the first magnet is magnetized to different magnetic poles at a first boundary parallel to the second direction, and the third magnet is magnetized to different magnetic poles at a third boundary parallel to the first direction.

13. The optical element driving device according to claim 12, wherein the second drive part further has a fourth magnet that is magnetized to different magnetic poles at a fourth boundary parallel to the first direction, and that is provided on the other side of the optical element than the third magnet, the second magnet and the fourth magnet are formed integrally, the second magnet is magnetized to different magnet poles at a second boundary parallel to the second direction and the fourth magnet is magnetized to different magnetic poles at a fourth boundary parallel to the first direction, and the first magnet and the second magnet are provided on opposite sides of the first imaginary line.

14. The optical element driving device according to claim 13, wherein the second direction drive mechanism further has a fourth coil disposed opposite the fourth magnet.

15. The optical element driving device according to claim 14, further comprising a second guide part configured to guide the moving member in the second direction with respect to the stationary member, wherein the moving member has:

a first moving frame that is mounted on the stationary member and is guided in the first direction by the first guide part, and a second moving frame having a support part supporting the optical element, the second moving frame is mounted on the first moving frame and is guided in the second direction by the second guide part, and the second guide part is disposed on the first moving frame at a position that does not overlap the third drive part in the first direction.

16. The optical element driving device according to claim 1, wherein the drive force of the first drive part is smaller than the drive force of the second drive part.

17. The optical element driving device according to claim 1, wherein the third driven part is disposed closer than the first driven part to a first imaginary line parallel to the second direction and passing through the center of gravity.

18. The optical element driving device according to claim 1, wherein the first and second driven parts are provided on opposite sides of the first imaginary line when viewed in the third direction.

19. The optical element driving device according to claim 1, wherein the third driven part is disposed to be aligned with the first driven part in the first direction.

20. An imaging apparatus capable of photographing a subject, the imaging apparatus comprising:

an imaging element configured to convert an optical image of the subject into an image signal;

an imaging optical system including a lens disposed opposite to the imaging element and configured to emit an optical image of the subject to the imaging element;

an optical image driving device configured to drive either the lens or the imaging element; and a main body configured to house the imaging element, the imaging optical system and the optical element driving device;

wherein the optical image driving device includes:

a moving member configured to support either the lens or the imaging element;

a stationary member configured to support the moving member to be movable in a first direction and a second direction intersecting the first direction;

a first direction drive mechanism having first and second drive parts provided to the stationary member, and first and second driven parts provided to the moving member and movable upon receiving a drive force from the first and second drive parts, and the first direction drive mechanism configured to drive the moving member in the first direction; and a second direction drive mechanism having a third drive part provided to the stationary member, and a third driven part provided to the moving member and movable upon receiving a drive force form the third drive part, and the second direction drive mechanism configured to drive the moving member in the second direction, the first and second driven parts arranged on opposite sides of the optical element when viewed in a third direction perpendicular to the first and second directions, and the third driven part arranged on the same side of the optical element as the first driven part when viewed in the third direction.

* * * * *